Oct. 17, 1933.    J. W. ANDERSON    1,931,098
WINDSHIELD WIPER
Filed Dec. 20, 1930
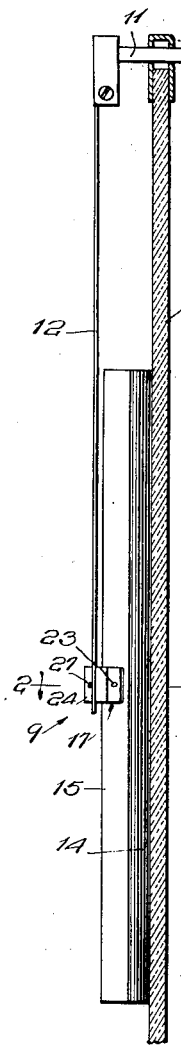
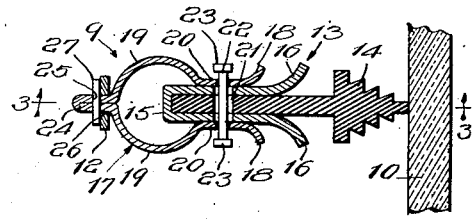
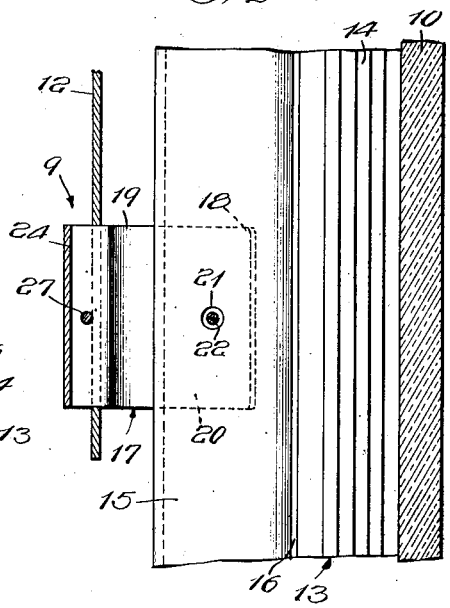
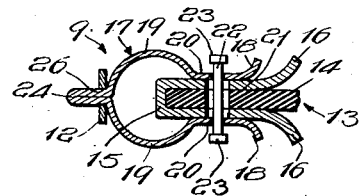
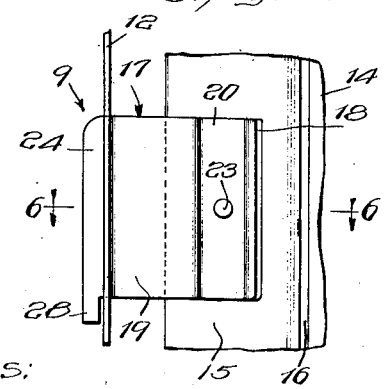
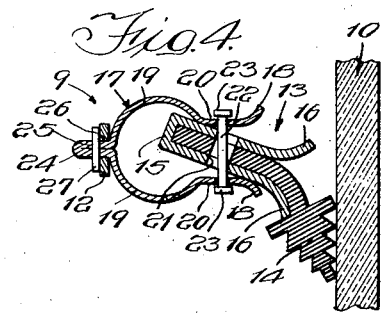
Inventor:
John W. Anderson
Hill & Hill
Attys.
Witness:
William P. Kilroy Patented Oct. 17, 1933

1,931,098

UNITED STATES PATENT OFFICE 1,931,098

WINDSHIELD WIPER

John W. Anderson, Gary, Ind.

Application December 20, 1930
Serial No. 503,707

5 Claims. (Cl. 15—250)

This invention relates to windshield wipers, and particularly to means for connecting the wiper blade to the arm by which the blade is moved across the surface of the windshield.

One object of the present invention is to provide a construction and arrangement wherein the blade is hingedly mounted with respect to the wiper arm and operating shaft in a manner to oscillate in a plurality of directions with respect to the arm and shaft.

Another object of the invention is to provide a wiper blade connector having means associated therewith for urging the wiper blade and parts of the connector into substantial alignment and toward a perpendicular position with respect to the surface of the windshield.

Another object of the invention is to provide a wiper blade connector having means associated therewith for assisting in changing the angularity of the wiper blade with respect to the surface of the windshield at each end of the wiping stroke in a manner to eliminate chattering when the direction of movement of the blade is reversed.

Another object of the invention is to provide a wiper blade connector having resilient means associated therewith for cushioning the relative movement of the wiper blade and parts of the connector, thereby avoiding a loose uncontrolled flopping action of the wiper blade at the end of its stroke and when the direction of movement of the blade is reversed.

Another object of the invention is to provide a wiper blade connector having means associated therewith for urging the wiper blade toward an intermediate or normal position when the wiper is at rest, thereby avoiding the lateral bending strain on the wiping element during its period of non-use.

Another object of the invention is to provide a structure wherein less power is required for operating the wiper and wherein means are provided for relieving excessive friction produced between the wiping element and the surface of the windshield due to partial dryness thereof or other friction producing conditions.

A further object of the invention is to provide a wiper blade connector having resilient means associated therewith to produce a rocking reflex action of the wiper blade at each end of its wiping stroke, thereby providing a quiet smoothly operating device.

A still further object of the present invention is to improve devices of the character described in sundry details hereinafter referred to and particularly pointed out in the appended claims.

One embodiment of the present invention is shown for illustrative purposes in the accompanying drawing in which Fig. 1 is an elevational view of the windshield wiper blade and supporting arm, showing its application to the windshield of a motor vehicle, or the like, and illustrating an embodiment of the present invention;

Fig. 2 is an enlarged sectional plan view taken substantially as indicated by the line 2—2 of Fig. 1;

Fig. 3 is a sectional elevation taken substantially as indicated by the line 3—3 of Fig. 2;

Fig. 4 is a sectional view similar to Fig. 2 showing portions of the device in changed positions which they may assume in the operation of the device;

Fig. 5 is an elevational view of a slightly modified form of clip embodying features of the present invention; and Fig. 6 is a sectional plan view taken substantially as indicated by the line 6—6 of Fig. 5.

In the drawing, the wiper blade and arm assembly is indicated as a whole by the reference character 9, and shown in its operative position with respect to a windshield 10 of a motor vehicle, or the like, at the top of which is mounted a rock shaft 11 to which is connected a supporting or operating wiper arm 12, in a manner to position a wiper blade 13 including a flexible wiping element 14 of rubber or other suitable material in cooperative relationship with the surface of the windshield. The rock shaft 11 may be connected to any suitable operating device (not shown) for oscillating the shaft in a manner to move the wiping element 14 over the surface of the windshield.

In the illustrative embodiment of the present invention the wiping element 14 is mounted in a holder 15 formed preferably of metal or other suitable material folded, in the present instance, to form a channel or groove between the legs or wall portions 16 of which the wiping element 14 is secured.

For connecting the wiper blade 13 to the arm 12, and operating shaft 11 a U-shaped clip designated as a whole by the numeral 17 is provided with resilient leg portions 18 adapted to engage opposite sides of the holder 15 in a manner to be secured thereto.

The leg portions 18 of the clip 17 are shown in the present instance as being bowed or bulged outwardly adjacent their connected end portions as indicated at 19, and provided with flat portions 20 adapted to engage the sides of the holder 15 forming a part of the wiper blade 13 in a manner to exert a force against the sides of the holder tending to urge the blade into alignment with the central portion of the clip 17.

For mounting the wiper blade 13, including the holder 15, the blade is provided with an aperture 21 extending therethrough, while the flat portions 20 of the legs 18 are provided with apertures adapted to be positioned in alignment with the apertures 21 formed in the wiper blade 13, and for loosely securing the wiper blade 13 to the legs 18, a bolt 22 is positioned in the aperture 21 and the apertures formed in the legs 18, the shank portion of the bolt being shown as having a transverse dimension substantially less than the diameter of the aperture 21 to permit a rocking movement of the blade on the bolt, the bowed or bulged portions 19 of the clip 17 providing clearance for the bight portion of the holder 15 as clearly shown in Fig. 4.

For securing the bolt 22 against accidental displacement, head portions 23 are formed adjacent the ends of the bolt outside the outer faces of the legs 18 and normally spaced therefrom as clearly shown in Figs. 2 and 6 to permit outward movement of the legs 18 in a manner to allow the wiper blade 13 including the holder 15 to assume an angular position with respect to the windshield during the wiping operation and against the resiliency of the legs 18 as shown in Fig. 4.

For securing the clip 17 to the arm 12, a fin 24 having an aperture 25 formed therein is formed on the clip adjacent the connected ends of the leg portions 18 and adapted to extend outwardly therefrom and through, preferably, an elongated aperture 26 formed adjacent the lower end of the wiper arm 12, and for securing the fin against displacement with respect to the aperture 26, a pin 27 is positioned in the aperture 25, the pin 27 being preferably tapered to provide a wedging action between one side of the aperture 25 and the adjacent face of the arm 12 in a manner to crowd the shoulder formed by the bowed or bulged portions 19 against the opposite face of the arm 12 and thereby secure the clip 17 rigidly to the arm as shown in Figs. 1, 2, 3 and 4.

In Figs. 5 and 6, a slightly modified construction of the fin is shown, in that the aperture 25 and pin 27 are omitted and instead thereof, the fin 24 is provided adjacent one of its end portions with a keeper 28 adapted to engage the outer face of the arm 12 in a manner to secure the clip against accidental displacement with respect thereto.

It will be observed from the foregoing description that inasmuch as the resiliency of the leg portions 18 of the clip 17 is intended normally to exert a force against opposite sides of the holder 15 tending to laterally align the blade and clip as shown in Fig. 2, it will also be observed that by such an arranagement, the force exerted by the legs 18 on the holder 15 at the end of each wiping stroke of the blade 13 will act to bring about such alignment and thereby assist in changing the angularity of the blade with respect to the surface of the windshield each time the direction of movement of the wiper blade and arm is reversed, thus promoting the prompt turning of the wiping element 14 to bring the proper side or face of the element into contact with the surface of the windshield for its return stroke.

It will be observed also that when the wiper blade is parked, usually at one end of its stroke, the force exerted by the legs 18 will serve to urge the blade and clip into substantial alignment as shown in Fig. 2, thereby relieving the wiping element 14 from the lateral bending strain prevalent in windshield wipers at present in use.

It will be observed further that by reason of the assistance rendered by the force exerted by the leg portions 18 in changing the angularity of the blade with respect to the surface of the windshield at the ends of its stroke, the action of the legs 18 eliminates chattering of the blade when reversing its direction of movement, and also, that in changing its angular position with respect to the surface of the windshield, the movement of the blade is cushioned against the resiliency of the leg portions, thereby preventing a loose uncontrolled flopping action of the blade as is characteristic of present devices.

Frequently when the windshield is slightly or partly dry as may result from a very light rain or fog, there is a tendency for the wiping element 14 to heat due to friction on the windshield, which results in a tendency of the wiping element to adhere or stick to the surface of the windshield and drag heavily thereon, thus increasing the strain on the source of motive power, whether electrically or vacuum operated, employed for operating the wiper. In the use of structures wherein the blade is connected substantially rigidly to the wiper arm during its wiping movement, the friction produced between the wiping element and windshield sometimes becomes sufficient to stall the wiper, whereas, in applicant's device, the resiliency provided by the leg portions 18 of the clip 17 permits the blade to yield when necessary to overcome any increased friction due to dryness of the windshield or other condition, thereby relieving the motor or other source of power from the effort otherwise required of it to overcome the additional friction, this yielding of the leg portions 18 reduces the strain otherwise thrown on the source of power and permits the continued operation of the wiper and associated elements. It will be observed that by such an arrangement, less power is required for the efficient operation of the wiper.

Obviously, the present invention is not limited to the precise construction and arrangement shown and described as the same may be variously modified within the scope of the claims. Moreover, all the features of the invention need not be used conjointly as the same may be used to advantage in variously different combinations and sub-combinations.

Having thus described my invention, what I claim as new and desire to cover by Letters Patent is:

1. In a windshield wiper, the combination with a wiper blade, of a supporting arm therefor, means for connecting said arm and blade, said means comprising a U-shaped member secured to said arm and having resilient leg portions engaging opposite sides of said blade, said leg portions being adapted to yield for permitting the blade to assume an angular position with respect to the windshield when the blade is moved across the surface thereof.

2. In a windshield wiper, the combination with a wiper blade, of a supporting arm therefor, means for connecting said arm and blade, said means comprising a U-shaped member secured to said arm and having resilient leg portions secured against lateral displacement from said blade, said leg portions having flat surfaces engageable simultaneously with opposite sides of said blade and being adapted to yield for permitting the blade to assume an angular position with respect to the windshield when the blade is moved across the surface thereof.

3. In a windshield wiper, the combination with a wiper blade, of a supporting arm therefor, means for connecting said arm and blade, said means comprising a U-shaped member rigidly secured to said arm and having resilient leg portions adapted to straddle said blade, said leg portions having flat surfaces engageable with the sides of said blade and being adapted to yield for permitting the blade to assume an angular position with respect to the windshield when the blade is moved across the surface thereof.

4. In a windshield wiper, the combination with a wiper blade, of a supporting arm therefor, means for connecting said arm and blade to permit a rocking movement of the blade about an axis substantially parallel to said blade and with respect to the arm, said means comprising a U-shaped member secured to said arm and having resilient leg portions adapted to straddle said blade, said leg portions having flat surfaces simultaneously engageable with the sides of said blade and being adapted to normally urge said blade toward a plane intermediate the extreme ends of its rocking movement.

5. In a windshield wiper, the combination with a wiper blade having an aperture formed therein, of a supporting arm for said blade, means for connecting said arm and blade, said means comprising a U-shaped member secured to said arm and provided with resilient leg portions adapted to straddle and simultaneously engage the opposite sides of said blade, said member having apertures formed therein, and means for securing said member to said blade, said securing means comprising a bolt mounted in the apertures formed in said blade and leg portions and having a transverse dimension substantially less than that of the aperture formed in the blade, and head portions adjacent the ends of said bolt and positioned outside the outer faces of said leg portions and normally in spaced relation with respect thereto.

JOHN W. ANDERSON.